United States Patent Office 3,245,994
Patented Apr. 12, 1966

3,245,994
THEOPHYLLINE DERIVATIVES
Karl Heinz Klingler, Langen, Hesse, Germany, and Ansgar von Schlichtegroll, Bad Homburg vor der Hohe, Germany, assignors to Deutsche Gold- und Silber-Scheideanstalt vormals Roessler, Frankfurt am Main, Germany
No Drawing. Filed Mar. 25, 1963, Ser. No. 267,795
Claims priority, application Germany, Mar. 30, 1962, D 38,531
6 Claims. (Cl. 260—256)

The present invention relates to novel theophylline derivatives carrying basic substituents and their pharmaceutically acceptable salts which have unexpectedly valuable pharmaceutical properties and particularly distinguish over previously known basically substituted theophylline compounds such as disclosed in German published applications DAS 1,011,424 and DAS 1,123,329 in their broncholytic activity which is greater than that of papaverin. In addition the novel compounds are less toxic and in many instances have a more favorable action on the circulation.

The novel compounds according to the invention are of the following formula:

$$T-Alk-NH-CH_2-Ph$$
$$\phantom{T-Alk-NH-}\overset{|}{R^1}$$

wherein T represents the theophyllinyl (7) radical that is:

[structure of theophyllinyl radical with CH₃—N—C=O, O=C, C—N, CH, CH₃—N—C—N]

Alk represents a straight or branch chained alkylene radical with 2–6 carbon atoms; $R^1$ represents —H or —CH₃; Ph represents

[benzodioxole structure with O—CH₂—O]

or

[phenyl structure with $R^2$, $R^3$, $R^4$]

in which $R^2$ is —Cl, —OH, —CH₃, —OCH₃ or

—OCH₂—[phenyl]

and each of $R^3$ and $R^4$ is —H, —Cl, —OH, —CH₃, —OCH₃ or

—OCH₂—[phenyl]

The novel compounds according to the invention can be prepared by reacting a 7 halogen alkyl theophylline of the formula T—Alk—Hal with an amine of the formula $$H_2N-CH-CH_2-Ph$$
$$\phantom{H_2N-}\overset{|}{R^1}$$

Expediently, such reaction is carried out at raised temperatures and in the presence of an acid binding agent and preferably in the presence of a solvent.

Analogously the novel compounds can also be prepared by reacting a 7-amino alkyl theophylline compound of the formula T—Alk—NH₂ with a compound of the formula $$Hal-CH-CH_2-Ph$$
$$\phantom{Hal-}\overset{|}{R^1}$$

under similar conditions.

Furthermore the compounds according to the invention can be prepared by condensing a 7 amino theophylline with a carbonyl derivative of the formula $$O=C-CH_2-Ph$$
$$\phantom{O=}\overset{|}{R^1}$$

or condensing a corresponding carbonyl derivative of a 7-alkyl theophylline with an amine of the formula $$H_2N-C-CH_2-Ph$$
$$\phantom{H_2N-}\overset{|}{R^1}$$

under hydrogenating conditions.

In the production of compounds wherein —Ph is a mono-, di- or trihydroxy substituted phenyl radical, it can be expedient first to produce the corresponding benzyloxy derivatives by one of the four processes described above and then to split off the benzyl groups by catalytic hydrogenation. Palladium has proved especially suited as catalyst for such hydrogenation.

The free bases according to the invention can be converted to their pharmaceutically acceptable salts with acids having pharmaceutically acceptable anions such as HCl, HBr, H₂SO₄, citric acid, lactic acid, phosphoric acid, succinic acid, maleic acid and the like. Of course, any less desired salt can be easily converted to a more desired salt.

The following examples will serve to illustrate a number of embodiments of the compounds according to the invention.

*Example 1*

12.4 g. p-methyl-phenyl acetone and 20.6 g. of 7-(β-aminoethyl)-theophylline were dissolved in 130 cc. of absolute methyl alcohol and after addition of 0.3 g. of platinum oxide shaken in an autoclave at 20° C. under hydrogen at a pressure of 15 atmospheres for 15 hours. After the catalyst was filtered off and about ⅔ of the solvent distilled off, the reaction mixture was acidified with ethanolic HCl. The precipitate was filtered off on a suction filter on the following day and recrystallized from a methanol-ethanol mixture. Yield: 11 g. (33% of theoretical) of 7-[2-(1-methyl-2-p-tolylethylamino)-ethyl]-theophylline hydrochloride. Melting point: 227–228° C.

Formula:

[structure of compound: CH₃—N—CO, OC, C—N, CH, CH₃—N—C—N with side chain CH₂—CH₂—NH—CH—CH₂—phenyl—CH₃ and CH₃]

The same compound also was produced by reacting 45 g. of 7-(β-aminoethyl)-theophylline with 16.8 g. of 2-chloro-3-p-tolyl-propane in boiling toluene.

*Example 2*

7.0 g. of p-methyl-phenylisopropyl amine, 15.5 g. of 7-(ξ-bromopentyl)-theophylline were refluxed while stirring for 4 hours with 6.4 g. of potassium carbonate in 23 cc. of toluene. After cooling down the inorganic salts were dissolved by addition of 20 cc. of water, the lower aqueous phase separated off in a separating funnel and the toluene then distilled off under vacuum. The residue was dissolved in 30 cc. of isopropyl alcohol and after filtering, the filtrate was acidified with isopropanolic HCl. On the following day the precipitate was filtered off and recrystallized from ethanol.

Yield: 6.3 g. (31% of theoretical) of 7-[5-1(methyl-2-p-tolylethylamino)-pentyl] - theophylline hydrochloride. Melting point: 176–178° C.

*Example 3*

14 g. of p-methyl-phenylisopropylamine were reacted with 32 g. 7-(ʓ-bromohexyl)-theophylline analogously to Example 2.

Yield: 12.0 g. (39% of theoretical) of 7-[6-(1-methyl-2-p-tolylethylamino)-hexyl]-theophylline - hydrochloride. Melting point: 160–163° C.

*Example 4*

16.4 g. of p-methoxy-phenylacetone and 24.5 g. of 7-(β-aminoethyl)-theophylline were dissolved in 140 cc. water free methanol and after addition of 0.3 g. platinum oxide shaken in an autoclave at 20° C. under a hydrogen pressure of 7 atmospheres for seven and one-half hours. The reaction mixture was then acidified with alcoholic HCl and filtered after 1 hour. The filtrate was allowed to stand in the refrigerator for several days and the precipitate then filtered off and recrystallized 4 times from ethanol.

Yield: 11 g. (27% of theoretical) of 7-[2-(1-methyl-2-p-methoxyphenyl-ethylamino)-ethyl]-theophylline - hydrochloride. Melting point: 212–214° C.

*Example 5*

19.0 g. of o-methoxy-phenylacetone and 26.0 g. 7-(β-amino-ethyl)-theophylline were dissolved in 150 cc. of methanol, 0.3 g. of platinum oxide added thereto and stirred for 7 hours at room temperature in an autoclave under a hydrogen pressure of 7 atmospheres. The product was recovered from the reaction mixture as in Example 4.

Yield: 28.2 g. (60% of theoretical) of 7-[2-(1-methyl-2-o-methoxyphenyl-ethylamino) - ethyl] - theophylline-hydrochloride.

*Example 6*

19.0 g. of m-methoxy-phenylacetone and 26.0 g. of 7-(β-aminoethyl)-theophylline were hydrogenated as described in Example 5 for 16 hours at a pressure of 14 atmospheres.

Yield: 21.3 g. (45% of theoretical) of 7-[2-(1-methyl-2 - m - methoxyphenyl - ethylamino) - ethyl] - theophyllinehydrochloride. Melting point: 198–200° C.

*Example 7*

34.9 g. of 3,4-dimethoxy-phenylacetone and 44.2 g. of 7-(β-aminoethyl)-theophylline were hydrogenated as described in Example 5 for 19 hours at a pressure of 15 atmospheres.

Yield: 36.4 g. (46% of theoretical) of 7-{2-[1-methyl-2 - (3,4 - dimethoxyphenyl) - ethylamino] - ethyl} - theophylline-hydrochloride. Melting point: 224–225° C.

*Example 8*

24.6 g. of 2,4-dimethoxy-phenylacetone and 31.0 g. of 7-(β-aminoethyl)-theophylline were hydrogenated as in Example 5 for 20 hours at a pressure of 15 atmospheres. The reaction product was purified by recrystallization from methanol in the extractor.

Yield: 38.2 g. (69% of theoretical) of 7-{2-[1-methyl-2 - (2,4 - dimethoxyphenyl) - ethylamino] - ethyl} - theophylline-hydrochloride. Melting point: 243–245° C.

*Example 9*

22.7 g. of 2,3-dimethoxy-phenylacetone and 29.5 g. of 7-(β-aminoethyl)-theophylline were hydrogenated as in Example 5 for 20 hours at a pressure of 15 atmospheres.

Yield: 25.9 g. (50.5% of theoretical) of 7-{2-[1-methyl-2 - (2,3 - dimethoxyphenyl) - ethylamino] - ethyl} - theophylline-hydrochloride. Melting point: 156–159° C.

*Example 10*

6.2 g. of 3,4-methylenedioxy-phenylacetone and 8.6 g. of 7-β-aminoethyl)-theophylline were hydrogenated as in Example 5 for 20 hours at a pressure of 15 atmospheres.

Yield: 6.8 g. (58.5% of theoretical) of 7-{2-[-1-methyl-2 - (3,4 - methylenedioxyphenyl) - ethylamino] - ethyl}-theophylline-hydrochloride. Melting point: 258–260° C.

*Example 11*

19.1 g. of 3,4,5-trimethoxy-phenylacetone and 21 g. of 7-(β-aminoethyl)-theophylline were hydrogenated as in Example 5 for 20 hours at a pressure of 15 atmospheres.

Yield: 14.5 g. (36.5% of theoretical) of 7-{β-[1-methyl - 2 - (3,4,5 - trimethoxyphenyl) - ethylamino}-ethyl]-theophylline-hydrochloride. Melting point: 210–213° C.

*Example 12*

25.6 g. of p-chloro-phenylacetone and 36.8 g. of 7-(β-aminoethyl)-theophylline were hydrogenated as in Example 5 for 20 hours at a pressure of 15 atmospheres. The crude reaction product was purified by recrystallization from methanol in the extractor.

Yield: 47.5 g. (76% of theoretical) of 7-[2-(1-methyl-2 - p - chlorophenyl - ethylamino) - ethyl] - thiophylline-hydrochloride. Melting point: 257–260° C.

*Example 13*

17.7 g. of m-chloro-phenylacetone and 25.4 g. of 7-(β-aminoethyl)-theophylline were dissolved in 140 cc. of methanol, 0.3 g. of platinum oxide added thereto and the mixture stirred in an autoclave for 18 hours at room temperature under hydrogen at a pressure of 14 atmospheres. The reaction mixture was filtered and acidified with alcoholic HCl. After standing overnight in the refrigerator the precipitate was filtered off and recrystallized from ethanol.

Yield: 13 g. (30% of theoretical) of 7-[2-(1-methyl-2 - m - chlorophenyl - ethylamino) - ethyl] - thiophylline-hydrochloride. Melting point: 199–200° C.

To produce the free base the hydrochloride was dissolved in warm water and the solution rendered alkaline with ammonia and extracted several times with chloroform. The chloroform extract was dried with potassium carbonate and upon distilling off the chloroform, the base of a melting point of 75–78° C. remained as the residue.

*Example 14*

19.6 g. of p-benzyloxy-phenylacetone and 21.0 g. of 7-(β-aminoethyl)-theophylline were dissolved in 150 cc. of methanol. 0.3 g. of platinum oxide added thereto and the mixture stirred in an autoclave at room temperature for 19 hours under hydrogen at a pressure of 14 atmospheres. The reaction mixture was filtered and acidified with alcoholic HCl. After standing overnight in the refrigerator the precipitate was filtered off and after addition of charcoal recrystallized from methanol and then from water.

Yield: 20 g. (51% of the theoretical) of 7-[2-(1-methyl - 2 - p - benzyloxy phenyl - ethylamino) - ethyl]-theophylline-hydrochloride. Melting point: 228–230° C.

2 g. of this compound were dissolved in a mixture of 80 cc. of water and 80 cc. of methanol and after addition of 0.3 g. of a 5% palladium oxide-barium sulfate catalyst shaken with hydrogen at room temperature in a duck shaped vessel. The hydrogenation was completed in about 2 hours. The mixture was filtered and the filtrate evaporated to dryness under vacuum. The residue was triturated with a small amount of ethanol and suction filtered on the following morning and washed with acetone.

Yield: 1.3 g. (80% of theoretical) 7-[2-(1-methyl-2-p - hydroxy phenyl - ethylamino) - ethyl] - theophylline-hydrochloride. Melting point 252–255° C.

*Example 15*

7 - [2 - (1 - methyl - 2 - m - benzyloxy phenyl - ethylamino)-ethyl]-theophylline-hydrochloride was prepared as in Example 14 starting from m-benzyloxy-phenylacetone.

Yield: 43% of the theoretical. Melting point: 221–223° C.

Catalytic hydrogenation as in Example 14 gave the corresponding p-hydroxyphenyl compound in a 66% of theoretical yield. Melting point: 176–178° C.

*Example 16*

12.8 g. of 3,4-dibenzyloxy-phenylacetone and 9.2 g. of 7-(β-aminoethyl)-theophylline were dissolved in 100 cc. of methanol and hydrogenated as in Example 14 for 26 hours under hydrogen at a pressure of 15 atmospheres. The reaction mixture was then shaken with a little active carbon, filtered, acidified with ethanolic HCl and after standing overnight the resulting precipitate filtered off and recrystallized from a methanol-ethanol mixture.

Yield: 12 g. (55% of theoretical) of 7-{2-[1-methyl-2 - (3,4 - dibenzyloxyphenyl) - ethylamino] - ethyl}-theophylline-hydrochloride. Melting point: 173–175° C.

This compound can also be obtained by a hydrogenating condensation of 3.6 g. of 3,4-dibenzyloxy phenyl-isopropylamine with 2.2 g. of theophyllinyl-7-acetaldehyde in ethanolic solution at normal pressure using platinum oxide as catalyst. 2 g. of the compound (34% of the theoretical) were thus obtained.

9.5 g. of the compound were dissolved in 600 cc. of 50% aqueous ethanol and after addition of 1.5 g. of a 5% palladium oxide-barium sulfate catalyst shaken with hydrogen at room temperature. After completion of the hydrogenation the catalyst was filtered off and the filtrate evaporated to dryness under nitrogen. The residue was then recrystallized from ethyl alcohol under a protective atmosphere of nitrogen.

Yield: 5.6 g. (85% of theoretical) of the corresponding 3,4-hydroxy phenyl compound. Melting point: 240–242° C.

*Example 17*

30.1 g. of 7-(γ-bromopropyl)-theophylline and 34.7 g. of 2,4-dibenzyloxyphenyl-isopropylamine were refluxed in 60 cc. of toluene to which 13.8 g. of potassium carbonate had been added for 4 hours while stirring. 51 cc. of water were added to the reaction mixture after it had cooled down to dissolve the inorganic salts, the lower aqueous phase separated off and the remaining toluene solution evaporated to dryness under vacuum. The residue was taken up in 115 cc. of ethanol and the resulting cloudy solution filtered and the filtrate acidified with ethanolic HCl. On the following morning the precipitate was filtered off and recrystallized from ethanol.

Yield: 27 g. (45% of theoretical) of 7-{3-[1-methyl-β'-(3,4-dibenzyloxyphenyl) - ethylamino] - propyl}-theophylline-hydrochloride. Melting point: 193–196° C.

Analogously to Example 16 the corresponding 10 g. (71% of theoretical) of 3,4-dihydroxyphenyl compound was recovered from 20.2 g. of the 3,4-dibenzyloxyphenyl compound. Melting point 251–252° C.

*Example 18*

Analogously to Example 17, 21.0 g. of 7-(δ-bromobutyl)-theophylline were reacted with 22.9 g. of 3,4-dibenzyloxyphenylisopropylamine.

Yield: 23.9 g. (58% of theoretical) of 7-{4-[1-methyl-2 - (3,4 - dibenzyloxyphenyl)-ethylamino]-butyl} - theophylline-hydrochloride. Melting point: 179–182° C.

Upon catalytic hydrogenation of this compound as in Example 17, 13.7 g. (81% of theoretical) of the corresponding 3,4-dihydroxyphenyl compound were obtained. Melting point: 173–175° C.

*Example 19*

Analogously to Example 17, 25.6 g. of 7-(ξ-bromopentyl)-theophylline were reacted with 26.8 g. of 3,4-dibenzyloxyphenylisopropylamine.

Yield: 14.9 g. (30% of theoretical) of 7-{5-[1-methyl-2 - (3,4 - dibenzyloxyphenyl)-ethylamino]-pentyl}-theophylline-hydrochloride. Melting point: 200–203° C.

Upon catalytic hydrogenation of this compound as in Example 17, 7 g. (66% of theoretical) of the corresponding 3,4-dihydroxyphenyl compound were obtained. Melting point: 215–216° C.

*Example 20*

Analogously to Example 17, 25.6 g. of 7-(ξ-bromohexyl)-theophylline were reacted with 25.9 g. of 3,4-dibenzyloxyphenylisopropylamine.

Yield: 9 g. (21% of theoretical) of 7-{6-[1-methyl-2-(3,4 - dibenzyloxyphenyl) - ethylamino]-hexyl}-theophylline-hydrochloride. Melting point about 100° C.

Upon catalytic hydrogenation of this compound as in Example 17, 4.8 (73.5% of theoretical) of the corresponding 3,4-dihydroxyphenyl compound were obtained. Melting point: 122–125° C.

*Example 21*

Analogously to Example 2, 14.0 g. of 7-(δ-bromopentyl)-theophylline were reacted with 6.0 g. p-methylphenylethylamine and 5.8 g. of potassium carbonate.

Yield: 6.5 g. (36% of theoretical) of 7-[4-(2-p-tolyl-ethylamino)-butyl]-theophylline-hydrochloride. Melting point: 177–179° C.

*Example 22*

8.3 g. of β-aminopropyl-theophylline and 4.6 g. of p-methyl-phenylacetone were dissolved in 100 cc. of absolute methanol and after addition of 0.4 g. of platinum oxide shaken for 24 hours at room temperature in an autoclave under hydrogen at a pressure of 25 atmospheres. The catalyst was filtered off and the filtrate acidified with ethanolic HCl. After standing overnight in the refrigerator the salt which had crystallized out was filtered off and recrystallized from ethanol.

Yield: 3.7 g. (30% of theoretical) of 7-[2-(1-methyl-2 - p - tolyl-ethylamino)-propyl]-theophylline-hydrochloride. Melting point: 235–237° C.

We claim:

1. A compound of the formula:

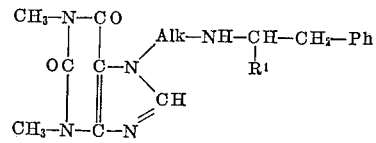

wherein Alk is an alkylene radical of 2–6 carbon atoms, $R^1$ is selected from the group consisting of —H and $CH_3$ and Ph is selected from the group consisting of

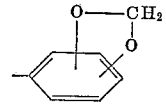

and

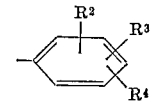

in which $R^2$ is selected from the group consisting of —OH, —$OCH_3$ and

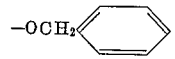

and each of $R^3$ and $R^4$ is selected from the group consisting of —H, —OH, —$OCH_3$ and

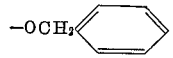

2. The compound of claim 1 in which $R^1$ is —$CH_3$ and at least one of $R^2$, $R^3$ and $R^4$ is —$OCH_3$ and the remainder —H.

3. The compound of claim 1 in which $R^1$ is —$CH_3$, $R^2$ and $R^3$ are

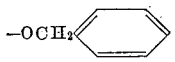

and $R^4$ is hydrogen.

4. The compound of claim 1 in which $R^1$ is —$CH_3$, $R^2$ and $R^3$ are —OH and $R^4$ is hydrogen.

5. The compound of claim 1 in which $R^1$ is —$CH_3$, $R^2$ is

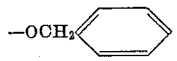

and $R^3$ and $R^4$ are hydrogen.

6. The compound of claim 1 in which $R^1$ is —$CH_3$, $R^2$ is —OH and $R^3$ and $R^4$ are hydrogen.

References Cited by the Examiner

UNITED STATES PATENTS 3,029,239    4/1962    Kohlstaedt et al. _____ 260—256

FOREIGN PATENTS 1,011,424    7/1957    Germany.
1,123,329    2/1962    Germany.

NICHOLAS S. RIZZO, *Primary Examiner.*

JAMES W. ADAMS, *Assistant Examiner.*